United States Patent [19]
Mitchell et al.

[11] 3,938,210
[45] Feb. 17, 1976

[54] SCUFF SLIPPER AND METHOD AND APPARATUS FOR THE MANUFACTURE THEREOF

[75] Inventors: James G. Mitchell; Winalee G. Mitchell, both of Perrysburg; Paul D. Purdy, Waterville, all of Ohio

[73] Assignees: James G. Mitchell; Winalee G. Mitchell, both of Perrysburg, Ohio

[22] Filed: Jan. 21, 1975

[21] Appl. No.: 542,751

[52] U.S. Cl. ................................. 12/1 W
[51] Int. Cl.² ........................... A43D 00/00
[58] Field of Search .......... 12/1 R, 1 A, 1 W, 142 S, 12/142 MC, 52, 53.5; 36/11.5, 10, 4, 2.5 R

[56] References Cited
UNITED STATES PATENTS

| | | | |
|---|---|---|---|
| 3,426,454 | 2/1969 | Mitchell et al. | 36/2.5 R |
| 3,523,378 | 11/1970 | Mitchell et al. | 36/2.5 R |
| 3,638,262 | 2/1972 | Mitchell et al. | 12/142 MC |

*Primary Examiner*—Patrick D. Lawson
*Attorney, Agent, or Firm*—Pollock, Vande Sande & Priddy

[57] ABSTRACT

Slippers of heat-sealable synthetic polymeric sheeting comprise a sole member and an upper member joined thereto by a heat-seal joint, the upper member having a progressively wider portion of said sheeting relative to the sole member, as measured across the slipper, whereby a permanent foot-receiving pocket is provided to facilitate donning the slipper without requiring the use of the hands. Method and apparatus for making such slippers comprise steps or means for joining separate bands of the material by heat-sealing the bands to each other on profiles corresponding to the sole and upper members, while simultaneously providing extra width in the upper member to create the foot receiving pocket.

15 Claims, 15 Drawing Figures

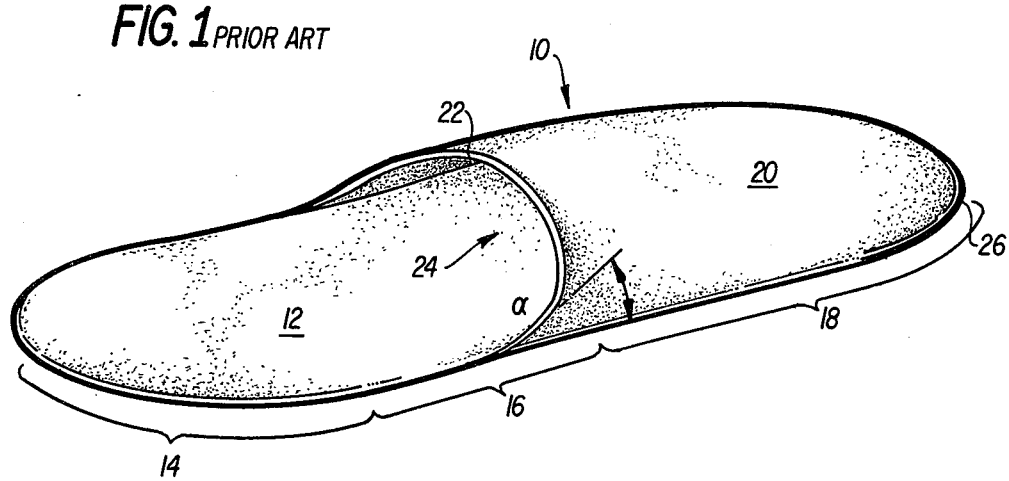
FIG. 1 PRIOR ART
FIG. 2 PRIOR ART
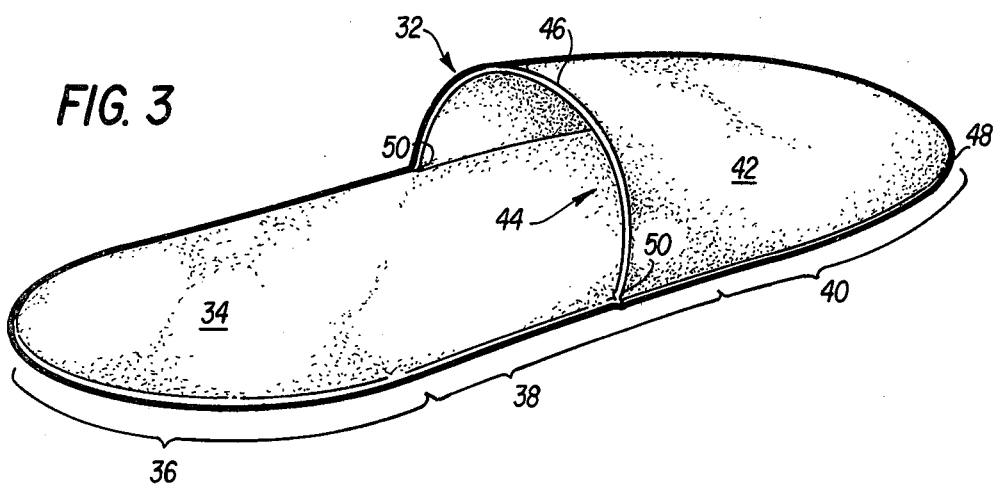
FIG. 3

SCUFF SLIPPER AND METHOD AND APPARATUS FOR THE MANUFACTURE THEREOF

BACKGROUND OF THE INVENTION

This invention relates to slippers having improved resistance to tearing which are formed from foamed synthetic polymeric or elastomeric sheeting. More particularly, the invention relates to a scuff type slipper which exhibits improved tear resistance at the rearmost point where its upper member is joined to its sole member. An improved method and an apparatus for making such a scuff slipper also comprise a part of this invention.

In the past, there has been a need for strong, sanitary and inexpensive footwear and for efficient methods and apparatus for manufacturing such articles. To a substantial extent, U.S. Pat. No. 3,238,079 has met this need by disclosing a slipper which is held on the wearer's foot by internal elastic tension in the slipper material. These slippers show a surprising degree of resistance to tearing of the material. Similarly, U.S. Pat. No. 3,793,746 discloses somewhat different types of slippers of the heel gripping and scuff types, which were developed with a view toward minimizing tearing at the rearmost location where the upper member of the slipper is joined to the lower member. Although slippers made in accordance with this latter patent exhibit improved tear resistance relative to prior art devices, it has been found that lateral tearing may occur at the location mentioned, especially in the larger sizes. Since such slippers are frequently used by institutions where their low price may be outweighed by a high failure rate, a need exists to develop such slippers which will exhibit satisfactory resistance to tearing in all sizes.

In addition, the above slipper types usually require the use of one or both hands of the wearer to don the slipper. In the instance of the slippers of U.S. Pat. No. 3,238,079, the use of the hands is required since the foot opening in the upper member of the slipper must be stretched somewhat to permit the foot to enter. The slippers of U.S. Pat. No. 3,793,746 require the use of the hands to slip the toe of the foot into the rather small foot-receiving pocket and to slip the heel of the foot into the heel-gripping portion. Even where no heel-gripping portion is provided, the use of the hands is required due to the rather small foot-receiving pocket. The slipper material adds to these difficulties since it is not at all slippery, but rather tends to resist sliding motion of the foot into the slipper. These characteristics have the desirable effect of tending to retain the slipper on the wearer's foot; however, for persons who for some reason are unable to reach their feet or may do so only with considerable discomfort, these prior art slippers are not entirely satisfactory. Thus, a need exists for simple, inexpensive, sanitary slippers having a design which permits the slipper to be donned without the use of the hands and to be worn without undue premature failure of the slipper material.

OBJECTS OF THE INVENTION

An object of the invention is to provide a slipper which is inexpensive, sanitary and easy to manufacture, yet has good resistance to tearing of the slipper material.

A further object of the invention is to provide a slipper which may be easily donned without requiring the use of the hands.

Another object of the invention is to provide a simple apparatus for automated manufacture of such slippers.

Still another object of the invention is to provide a process for manufacturing such slippers.

These objects of the invention are intended to be only exemplary, thus, other improved characteristics and advantages inherently achieved by the invention may occur to those skilled in the art; however, the scope of the invention is to be limited only by the appended claims.

SUMMARY OF THE INVENTION

The above-described and other objects are met by the disclosed invention, which provides a unique slipper comprising a sole member having heel, instep and toe portions and an upper member having instep and toe covering portions. As measured across the width of the sole and upper members, a progressively greater length of sheeting is provided in the upper member from its toe to its instep covering portion that in the sole member from its toe to its instep. The sole and upper members are joined by a heat-sealed seam extending around the periphery of the instep and toe portions of the sole and upper members to define a foot-receiving pocket.

The apparatus according to the invention includes means for dispensing a first band of synthetic polymeric sheeting material with a width greater than a desired length or size of the slipper sole and means for dispensing a second band of synthetic polymeric sheeting material with a second width narrower than the first width but greater than a desired length of the upper portion of the slipper. These bands of material are fed between first and second heat-sealing dies which have essentially congruent perimetral die face configurations shaped are required for the heel, instep and toe portions of the slipper. Located between the first and second heat-sealing dies is a means for providing, as measured across the width of the heat-sealing dies, a progressively greater length of the second band of material from the toe portion to the instep portion of one of the heat-sealing dies than of the first band of material from the toe portion to the instep portion of the other of the heat-sealing dies, when the dies are brought together. Means are also provided for bringing the first and second heat-sealing dies together to cause heat-sealing between the bands of synthetic polymeric sheeting material. The apparatus accoding to the invention may also include means for removing a completed slipper from the device after the heat-sealing dies have opened.

In the method according to the invention, first and second bands of material as previously described are drawn into superposed paths of movement and stopped between first and second heat-sealing dies which have desired perimetral die face configurations for the heel, instep and toe portions of the slipper according to the invention. As measured in the direction of movement of the bands of material across the die faces (i.e., across the width of the sole and upper members), a progressively greater length of material is provided in one of the bands from the toe portion to the instep portion of one of the die faces than in the other band of material from the toe portion to the instep portion of the other die face. Then the first and second bands are heat-sealed to each other at their toe and instep portions, by closing the heat-sealing dies.

BRIEF DESCRIPTION OF THE DRAWINGS

FIG. 1 shows a perspective view of a scuff slipper of a type known in the prior art.

FIG. 2 shows a side elevation view of the slipper shown in FIG. 1.

FIG. 3 shows a perspective view of a scuff slipper according to the present invention.

DETAILED DESCRIPTION OF THE PREFERRED EMBODIMENTS

Figure 4:
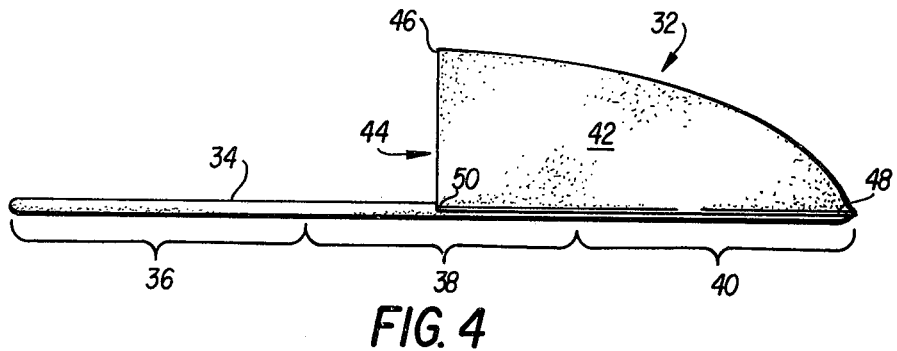
FIG. 4 shows a side elevation of the scuff slipper according to the invention.

There follows a detailed description of the preferred embodiments of the invention, reference being had to the drawings in which like reference numerals identify like elements of structure in each of the several Figures.

FIGS. 1 and 2 show perspective and side elevation views of a scuff slippepr of a type known in the prior art. See, for example, U.S. Pat. No. 3,793,746. This slipper 10 comprises a sole 12 having a heel portion 14, an instep portion 16 and a toe portion 18. An essentially flat upper 20 is attached to sole 12 and includes an instep avoiding cusp 22 which provides an angle alpha between the upper 20 and the sole 12 at the point where the uppepr is joined to the sole. A rather shallow foot-receiving pocket 24 is formed between sole 12 and upper 20 when heat-sealed seam 26 is made, as indicated. As discussed in U.S. Pat. No. 3,793,746, the instep avoiding cusp and the acute angle alpha between the cusp and the sole were intended to prevent tearing of the synthetic polymeric material at the rearmost point where the upper 20 is joined to the sole 12. Cusp 22 ensures that the upper 20 will not be stretched over the relatively high instep of the wearer's foot, and angle alpha provides an excess of material between the forward edge of cusp 22 of the rearmost point of attachment of upper 20 to sole 12. Thus, stresses in the rearmost portion of the joint between the upper 20 and the sole 12 are reduced by this prior art design. Nonetheless, it has been found that tearing still occurs at this location, particularly in the larger sizes of the slippers. It is thought that this tearing is due to the shallow pocket 24, which requires that upper 20 stretch considerably just to accomodate the toe of the wearer's foot. Moreover, the shallow pocket 24 requires in most instances that the wearer use his hands to don the slipper. Manufacture of this slipper is complicated by the need to center cusp 22 precisely on sole 12 after previously cutting the cust in the upper.

FIGS. 3 and 4 show perspective and side elevation views of a scuff slipper according to the present invention. Slipper 32 comprises a sole 34 having a heel portion 36, an instep portion 38 and toe portion 40. An upper 42 is joined to sole 34 to provide a foot-receiving pocket 44 having an instep gripping arch 46 along the rear edge thereof. Upper 42 is joined to lower 32 by a heat-sealed seam 48, as inciated. Additional material is required for instep gripping arch 46 of foot-receiving pocket 44. As measured across the width of sole 34 and upper 42, a progressively greater length of synthetic polymeric sheeting material is provided from the toe to the instep covering portion of upper 42 than in sole 34 from toe portion 40 to instep portion 38. This ensures that while sole 34 remains essentially flat in the completed sliper, upper 42 rises gradually from the toe to form the instep gripping arch 46. The provision of the extra sheeting material at the location of instep gripping arch 42 provides additional stretchiness at this location, thereby distributing the loads caused by the wearer's donning and walking in the slipper. The instep gripping arch 46 is thereby minimized, which results in improved resistance to tearing at this location and longer slipper life.

Although no limitation of the scope of the invention is intended, in one version of the slipper according to the invention wherein sole 34 had a length of approximately 12 inches, instep gripping arch 46 was formed approximately half way along sole 34 at which point sole 34 had a width of approximately 4 ½ inches and upper 42 had a total width of approximately 6 inches. The additional material provided sufficient stretchiness in the area in which the slipper engages the wearer's instep to prevent tearing at points 50 and permit easy donning of the slipper; however, the fit at instep gripping arch 46 was sufficiently snug to prevent the slipper from easily falling off the wearer's foot.

As used in this specification, synthetic polymeric sheeting material refers to any material resembling synthetic rubber in its properties. That is, the material is flexible, stretchy and preferably is cellular or spongy through its thickness. Commonly available polyurethane foams are useful in the invention, such as those made by "blowing" a polyester resin with the aid of a diisocyanate compound. Other compounds such as vinyl may also be used. One skilled in the art will realize that multiple ply bands of such materials may also be used without departing from the spirit of the invention, such as an outer polyurethane foam layer having an inner, synthetic fiber cloth bonded thereto.

Figure 5:
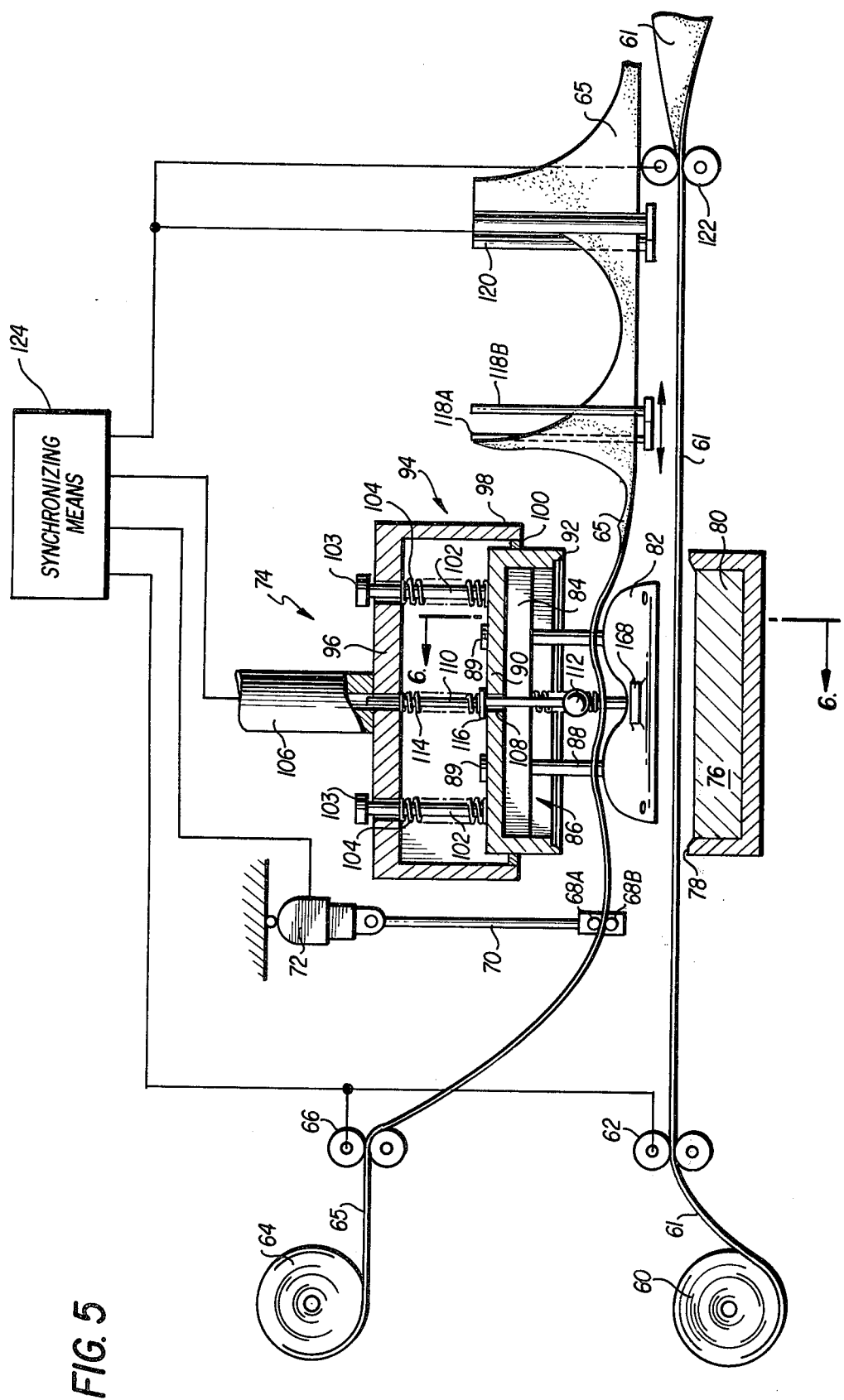
FIG. 5 shows a schematic view, partially in vertical section, of the apparatus according to the invention.

FIG. 5 shows a schematic view, partially in elevational section, of a slipper manufacturing apparatus according to the invention. A roll 60 of synthetic polymeric sheeting material having a width greater than the desired length of a slipper sole 34 dispenses a first band 61 of the material which is fed through drive rollers 62. A roll 64 of synthetic polymeric sheeting material having a width narrower than that of roll 60 but greater than a desired length of upper 42 dispenses a second band of material 65 which is fed through drive rollers 66. Drive rollers 66 usually are operated at from 5 to 15% higher speed than drive rollers 62, with a preferred difference being approximately 8%. The higher speed on rollers 66 is preferred to assist in providing the additional material in upper 42, as previously discussed. Alternatively, the additional material could be provided by stopping band 65 later than band 61 or allowing more waste material between slippers in band 61 while running both at the same speeds. Band 65 is then fed between feed tensioning fingers 68a and 68b and band 61 is fed beneath tensioning finger 68b. Tensioning fingers 68a and 68b are attached to connecting rod 70 which is reciprocated via hydraulic or pneumatic actuator 72.

Although two separate rolls 60 and 64 of material are shown in FIG. 5, it should be understood that a single roll of material could be used which has been folded upon itself to provide band widths corresponding to bands 61 and 65. Techniques for such folding are known in the art as shown in U.S. Pat. No. 3,523,378. In this instance, as will become apparent from the ensuing discussion of the operation of the apparatus according to the invention, it would be necessary to split the folded band ahead of the drive rollers 62 and 66 to permit the differential driving speeds discussed above.

After passing feed tensioning fingers 68a and 68b, bands 61 and 65 are drawn in superposed relationship into slipper forming and heat sealing die press 74. Band 61 passes over lower, stationary die 76 which comprises an upstanding perimetral die face 78 spaced from and surrounding a heat-insulating central core 80 of asbestos or a similar material. Core 80 prevents over heating of the central portions of sole 34 during manufacture, thereby reducing any tendency to weaken the sole material due to partial melting. Die face 78 is heated by induction heaters (not shown), as is known in the art, and has a perimetral configuration corresponding to sole 34. Band 65 passes over sole plate 82 which is suspended for movement relative to upper, movable heat sealing die 84. Heat sealing die 84 comprises a hollow central portion 86 into which sole plate 82 retracts when the dies are closed. Legs 88 having flanged heads 89 support sole plate 82 within hollow central portion 86 via bores in upper wall 90 of heat sealing die 84. A downwardly projecting perimetral die face 92 is arranged for making contact with die face 78 when the dies are closed. Die face 92 is likewise heated by induction heaters or the like (not shown), and has a perimetral configuration essentially congruent to that of die face 78.

Surrounding heat sealing die 84 is shearing cutter assembly 94 which comprises an upper wall or base 96 from which depend side walls 98, having hardened cutting inserts 100 at their lower ends which conform to the shape of the perimetral configuration of die faces 78 and 92. Shearing cutter 94 functions to separate completed slippers from bands 61 and 65. Legs 102 having flanged heads 103 are mounted in bores in base 96 and attached at their lower ends to upper heat sealing die 84. Springs 104 bias upper heat sealing die 84 away from base 96. Springs 94 are chosen to provide sufficient compressive force to press die faces 78 and 92 together sufficiently closely to promote the formation of heat-sealed seam 48 of the slipper. An actuating shaft 106 is attached to the upper surface of base 96, through which pressure is applied to close the heat sealing dies, thereby forming the slipper according to the invention, and separate the slipper from scrap material which continues through the machine.

A bore 108 in upper wall 90 of heat sealing die 84 receives roller support shaft 110 which includes at its lower end arch forming rollers 112 and 113. See also FIG. 6. A spring 114 cooperates with a flange 116 formed integrally with support shaft 110 and with the underside of base 96 to bias rollers 112 and 113 resiliently downward below the edge of die face 92 when the die press is open, as shown.

Upper band 65 is then twisted to pass between upward extending, laterally adjustable guide fingers 118a and 118b and then through upwardly extending outfeed rollers 120. Simultaneously, lower band 61 is passed through outfeed rollers 122. Outfeed rollers 120 and 122 are operated at from 5 to 20 percent greater speed than infeed rollers 62 and 66, with approximately 8% being preferred. This speed differential stretches bands 61 and 65 continuously, thereby minimizing crimping and buckling of the bands as they move through the apparatus. As is known by those in the art, polyurethane foam material deveops a substantial amount of friction with surfaces over which it is drawn, which is overcome to some extent by this differential speed.

A synchronizing mechanism 124, of mechanical or other type, programs the sequence of operations of infeed rollers 62 and 66, feed tensioning fingers 68, heat sealing die press 74 and outfeed rollers 120 and 122. These objectives may easily be attained through the use of electric rotary switch timer clocks or electronic sequence timers, hydraulic and/or pneumatic pumps, solenoid valves, limit switches and related control apparatus with which those skilled in the art are familiar. Thus the synchronizing mechanism 124 has been shown only schematically. The sequence of operation controlled by mechanism 124 will be discussed subsequently. Guide fingers 118a and 118b are manually adjustable by the machine operator, as will be discussed.

Figure 6:
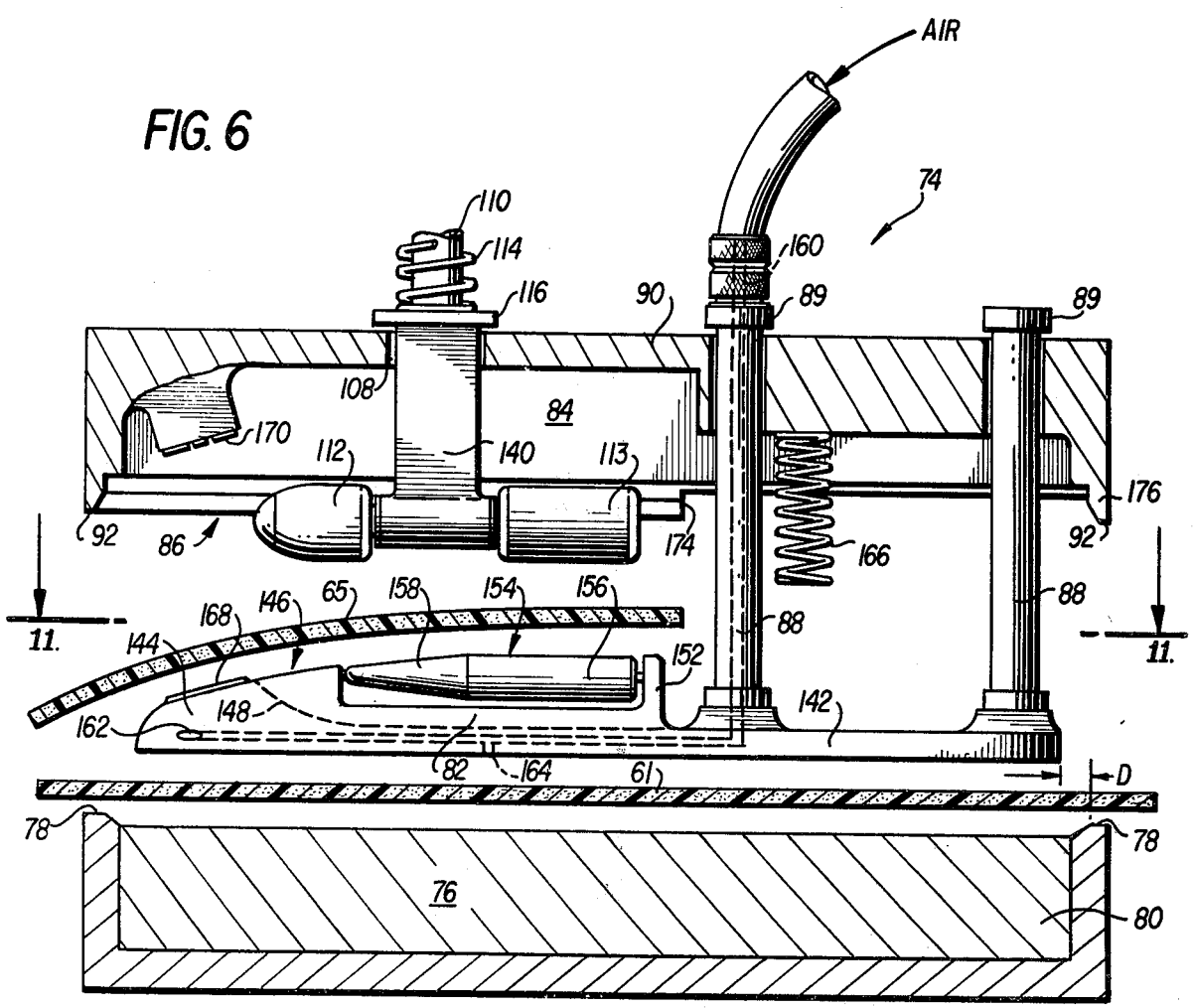
FIG. 6 shows a section view taken along line 6—6 of FIG. 5, indicating the elements of the heat-sealing die press according to the invention.

FIG. 6 shows a view taken along line 6—6 of FIG. 5, indicating the cooperation of the various elements of heat-sealing die press 74. The lower portion 140 of roller support shaft 110 and bore 108 have oval or oblong cross sections to prevent rotation of shaft 110 but permit its reciprocation as the die press closes and opens. Rollers 112 and 113 are journaled in plain bearings at the lower end of shaft 110.

Sole plate 82 comprises a flat base plate 142 conforming generally to the shape of sole 34 of slipper 32. See also the discussion of FIG. 11. The peripheral edge of sole plate 82 is spaced from the interior edges of die faces 78 and 92 by a distance "D" equal to approximately 2 thicknesses of the material comprising bands 61 and 65. This clearance is necessary to prevent the heat-sealing dies from abrading and partially fusing or locally sealing surfaces of bands 61 and 65 as heat sealing die press 74 is closed, thereby ensuring that heat sealing occurs only in the desired region of seam 48 shown in FIGS. 3 and 4.

The forward end of sole plate 82 includes a rounded, toe forming portion 144, corresponding in location to the toe-forming portions of die faces 78 and 92. Located just behind toe forming portion 144 is a rounded recess 146 (indicated in phantom) which extends essentially tranversely to the direction in which bands 61 and 65 are drawn through the heat-sealing die press, toward the rear of base plate 142, corresponding in location to the instep portions of die faces 78 and 92. In other words, recess 146 extends essentially along the longitudinal axis of base plate 142. The recess has a concave forward wall 148 (shown in phantom) which slopes rearwardly toward base plate 142, from toe forming portion 144. Concave forward wall 148 and roller 112 are similarly shaped, as indicated. An infeed side wall 150 (See FIG. 11) and an outfeed side wall 152 define the lateral boundaries of recess 146. Located on the upper edge of outfeed side wall 152 is outfeed roller 154 which comprises a cylindrical section 156 and a tapered section 158 which fares smoothly into the rounded toe forming portion 144. Roller 154 is journaled in plane bearings for rotation along an axis essentially parallel to recess 146. As will be subsequently discussed, cooperation between rollers 112 and 113, recess 146 and roller 154 provides, as measured across the die faces in the direction of movement of bands 61 and 65, a progressively greater length of band 65 from the toe to the instep portion of upper heat-sealing die face 92, than of band 61 from the toe to the instep portion of lower heat-sealing die face 78. This progressively greater amount of band 65 provides a large foot-receiving pocket 44 and instep-gripping arch 46, as shown in FIG. 3. All surfaces of sole plate 82 should be smoothly finished to minimize snagging of the material during operation.

One of support legs 88 includes a central air flow conduit 160 which delivers air under pressure to slipper removal jets 162 located in the rounded toe forming portion 144 and to slipper removal jets 164 located in the bottom surface of base plate 142. In operation, a small volume of air is continuously directed through air flow conduit 160 to provide cooling of sole plate 82 and thereby minimize undesirable fusing or searing of material bands 61 and 65, except in the areas pressed between die faces 78 and 92. As will be subsequently discussed, the flow rate of air through conduit 160 is increased briefly after the slipper has been formed and heat-sealing die press 74 has opened, whereby each newly formed slipper is ejected from sole plate 82 by the resulting increased air flow.

As inciated in FIG. 6, the left hand edges of bands 61 and 65 are essentially aligned as bands 61 and 65 are drawn over sole plate 82. The left hand ends also extend outside of heat-sealing die faces 78 and 92. The right hand end of band 65 extends to a location just to the rear of roller 54 and forms instep gripping arch 46 in a completed slipper. The right hand edge of band 61 extends beyond heat-sealing die faces 78 and 92 at the rear of sole plate 82. The left hand edges of both bands and the right hand edge of band 61 thus form continuous strips of scrap material which are withdrawn from the machine. See also FIGS. 12 to 14. Spring 166 is mounted to the under surface of upper wall 90 and serves to bias sole plate 82 into contact with lower band 61 when the die press closes and to force sole plate 82 to drop to its illustrated position below upper heat sealing die 84 when the die press opens.

Located on the rounded, toe forming portion 144 of sole plate 82 is flattened anvil surface 168 which is situated directly below a design impressing die 170 located on the under surface of upper wall 90 of heatsealing die 84, as indicated. Anvil surface 168 and design impressing die 170 are located so that when heat-sealing die press 74 closes, die 170 will contact material band 65 and press it against anvil 168, thereby imprinting upon the toe portion of each completed sliper an ornamental design chosen by the manufacturer or customer.

Heat-sealing die faces 78 and 92 are essentially congruent in perimetral configuration. Each has a perimetral shape corresponding approximately to the outline of sole 34 of slipper 32, as indicated in FIGS. 3 and 4. Since no heat sealing is to be effected in heel portion 36 and a portion of instep portion 38 of sole 34, depending die face 92 is relieved in this area as indicated in greatly enlarged scale at 174. A relief of 0.010 to 0.015 inch is sufficient. Relief 174 provides an expanded clearance between heat-sealing die faces 78 and 92 in the instep and heel portions of sole 34, thereby minimizing fusing of the edges in this location while still providing a slight sear of the material, which provides an improved edge appearance and is thought to contribute somewhat to strength. The softening of the material also permits shear cutter 94 to cut each completed slipper more easily from the surrounding scrap material. A small unrelieved section 176 is retained at the back of the heel portion of heat-sealing die face 92, to prevent rocking of the dies relative to one another when the die press closes.

Figure 7:
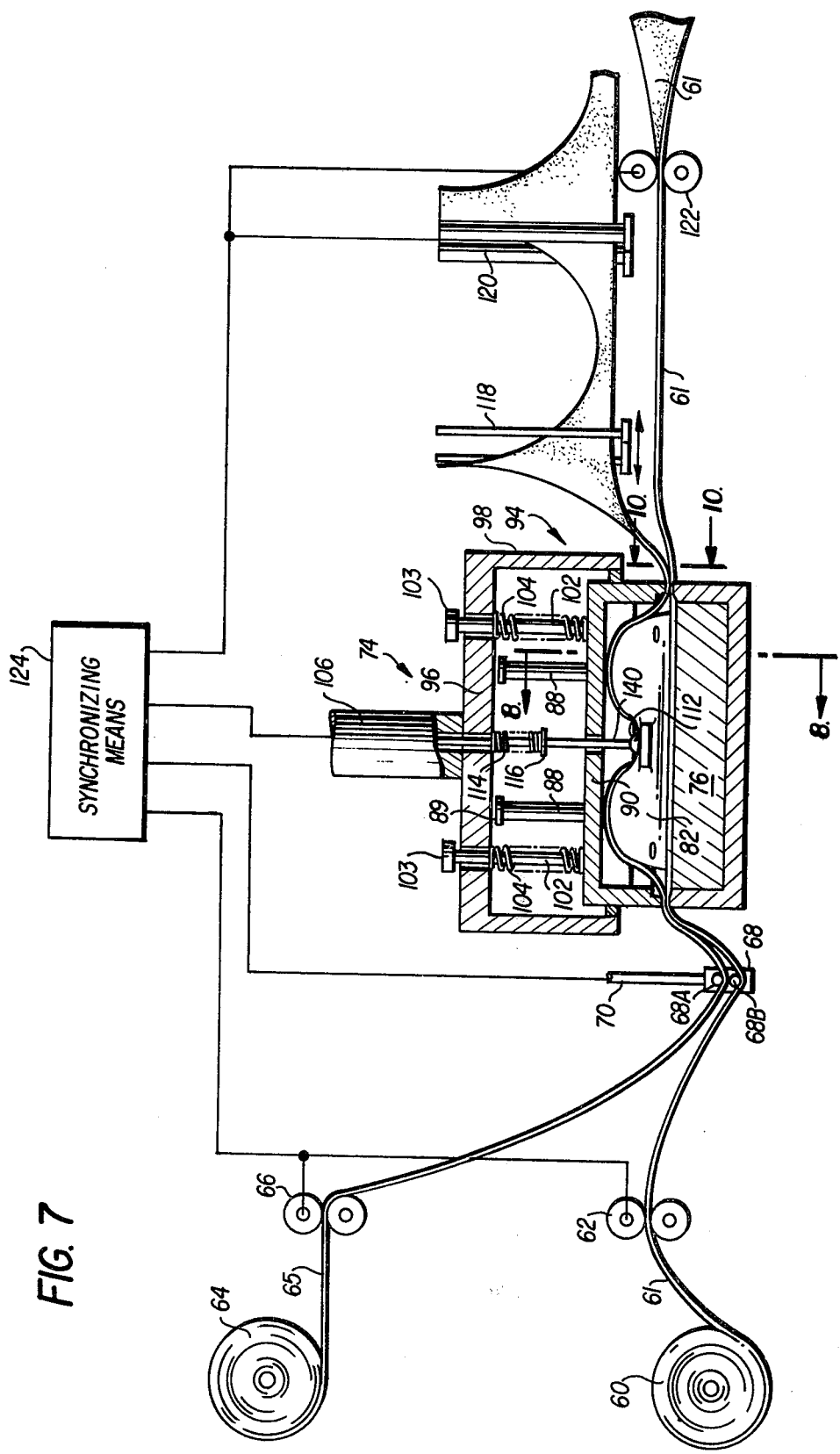
FIG. 7 shows a schematic view, partially in section, of the same components of the invention shown in FIG. 5, wherein the heat-sealing die press has been closed to form a slipper according to the invention.
Figure 8:
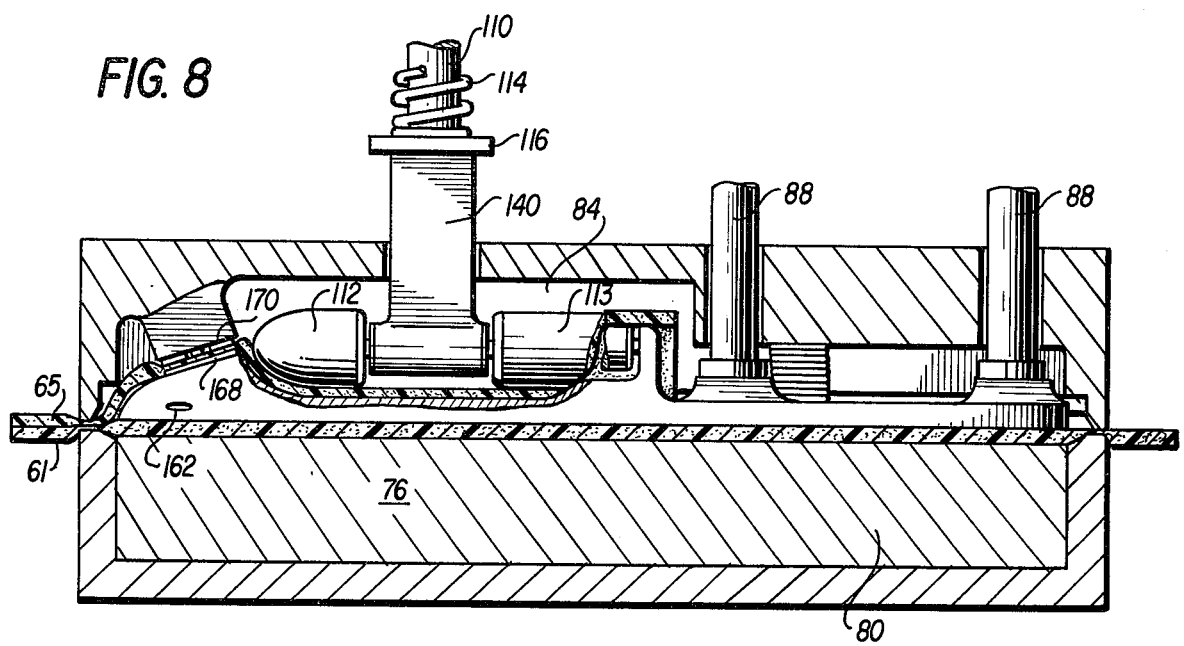
FIG. 8 shows a view taken along line 8—8 of FIG. 7, partially broken away to show the cooperation of the interior elements of the heat-sealing die press according to the invention.

FIGS. 7 and 8 illustrate the configuration of the slipper forming apparatus according to the invention after the die press 74 has closed and shearing cutter 94 has begun to descend to shear the completed slipper from the surrounding scrap material. At the beginning of an operating cycle of the machine, feed fingers 68a and 68b are raised by actuator 72 to the elevated position shown in FIG. 5. Infeed rollers 62 and 66 and outfeed rollers 120 and 122 then draw a length of bands 61 and 65 into heat-sealing die press 74, following which the feed of bands 61 and 65 is terminated and feed fingers 68a and 68b are lowered to the position shown in FIG. 7. The lowering of feed fingers 68a and 68b stretches band 65 down over the infeed side of sole plate 82 and stretches band 61 down over the edge of heat-sealing die face 78. The upper heat-sealing die 84 is then lowered in response to force applied to actuating shaft 106. As upper heat-sealing die 84 moves downward band 65 relaxes on the infeed side before rollers 112 and 113 contact it 65 in the area adjacent its right hand edge and press it into recess 146. As band 65 is pressed into recess 146 the slack on the infeed side and a portion of band 65 on the outfeed side of heat sealing die press 74 are drawn into recess 146 over infeed wall 150 and roller 154. Roller 154 faciliates drawing a portion of band 65 from the outfeed side back into recess 146 without undesirable stretching of the band material at the outfeed side. Approximately one-third of the material pressed into recess 146 comes from the infeed side and two-thirds from the outfeed side. It is important that rollers 112 and 113 extend below the upper heat-sealing die face 92, as shown, so that band 65 will be contacted and pressed into recess 146 before the heat-sealing die faces 78 and 92 are sufficiently close to inhibit the movement of material band 65 into recess 146.

The heat-sealing die faces 78 and 92 are then brought into virtual contact, which fuses the material of bands 61 and 65 caught between the die faces to form heat-sealed seam 48 shown in FIGS. 3 and 4. The dies remain closed for a short period, usually only a fraction of a second, sufficient to cause the material compressed therebetween to reach a state of coalescence or incipient melting, where upon the portions of bands 61 and 65 compressed between die faces 78 and 92 blend together to form a permanent heat-sealed seam 48. Simultaneously, anvil surface 168 and design impressing die 170 cooperate as indicated in FIG. 8 to impress a design on the toe of the slipper. It is preferred that shearing cutter 94 descend past the location of die faces 78 and 92 just as seam 48 is being formed, since the softening of the material at that time facilitates shearing. Nonetheless, it may be desirable in some instances to shear the material before seam 48 is completely formed, say, to accelerate the process of manufacture. Such a variation is within the scope of this invention. After heat-sealed seam 48 has been formed and shearing cutter 94 has removed the slipper from the surrounding scrap, die press 74 opens and a completed slipper 32 is ready for ejection from sole plate 82.

Figure 9:
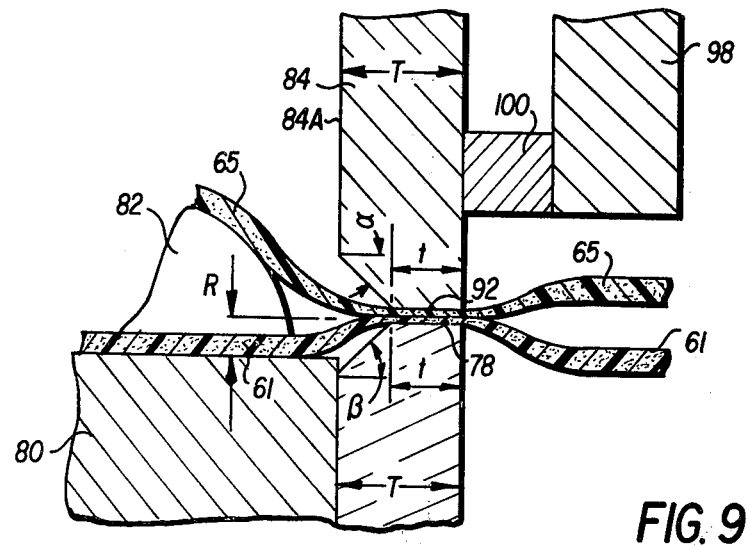
FIG. 9 shows an enlarged view of the contact area between the upper and lower die faces of the heat-sealing die press, indicating the geometry of the heat-sealing die faces and the effect they have on the synthetic polymeric sheeting material as the heat seal is formed.

FIG. 9 shows an enlarged view of the geometry of heat sealing die faces 78 and 92 at the time when the heat-sealing die press 74 has been closed to form the seam 48. Each of the heat-sealing dies comprises a wall member of a thickness T which is chamfered on its inner surface at angles beta and gamma to produce die faces 78 and 92, which are of a width $t$. In one embodiment of the invention, dimension T is approximately one-quarter inch; $t$, one-eigth inch; and angles beta and gamma 45° each. As indicated, the upper surface of heat insulating core 80 of lower heat-sealing die 76 is located below heat-sealing die face 78 by an amount R. The amount of relief provided at R is determined by the amount of compression of band 65 which it is desired to obtain between anvil surface 168 and design impressing die 170 when heat-sealing die press 74 is close. In practice, this relief has been as much as 0.050 inches while still providing adequate impression of a desired design on the toe of the completed slipper.

FIG. 9 also illustrates the orientation of bands 61 and 65 at the time the heat-sealed seam is formed. Within heat sealing die press 74, band 61 is pressed against heat insulating core 80 by the lower surface of sole plate 82 and band 65 is pulled over the upper surface of sole plate 82 and into recess 146. It has been found desirable in some instances to replace chamfer gamma by a circular radius to minimize abrasion of band 65 as heat-sealing die press 74 closes. To further minimize abrasion at this location, the inner surface 84a may be coated with high lubricity material such as Teflon.

Figure 10A:
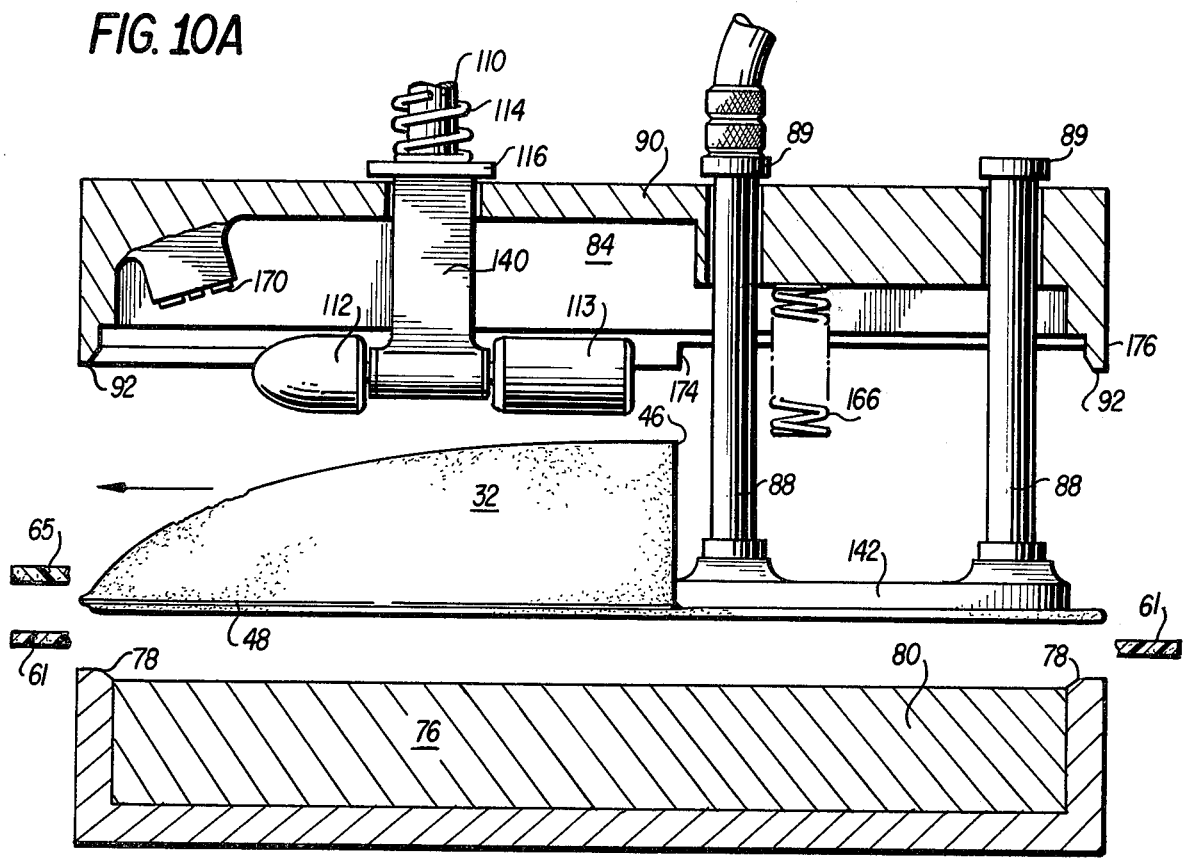
FIG. 10A shows a view taken along the same line as FIG. 6; however, in this instance a completed slipper is shown disposed on the interior sole plate of the heat-sealing die press according to the invention.
Figure 10B:
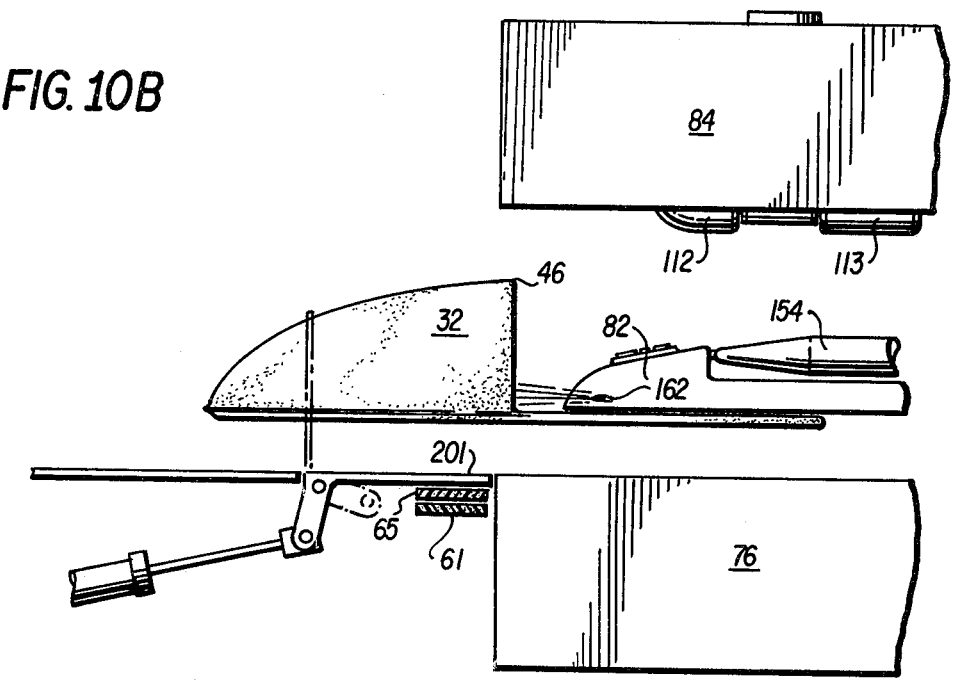
FIG. 10B shows a view taken along line 10—10 of FIG. 7, indicating the function of the eject gate and scrap material depressor.

Before or after the heat-sealed seam 48 has been formed, hardened cutting inserts 100 of shearing cutter 94 are forced downward along the outside of upper heat-sealing die 84 to shear the completed slipper from the remaining scrap portion of bands 61 and 65. After the scrap portions of bands 61 and 65 have been sheared from the completed slipper, the upper heat-sealing die 84 rises to the position shown in FIG. 10A. Instep gripping arch 46 springs upward from recess 146, thereby freeing the completed slipper for easy removal from sole plate 82. As the upper heat-sealing die rises, the scrap portions of bands 61 and 65 are depressed by eject gate 210 as shown in FIG. 10B, which simultaneously actuates an increased flow of air to conduits 160, causing the completed slipper 32 to be accelerated from the toe end of sole plate 82 for further handling. As eject gate 201 rises from its lowered position, feed fingers 68a and 68b rise and, when upper heat-sealing die 84 reaches the top of its stroke, feed rollers 62 and 66 are started again to repeat the cycle for the following slipper.

Figure 11:
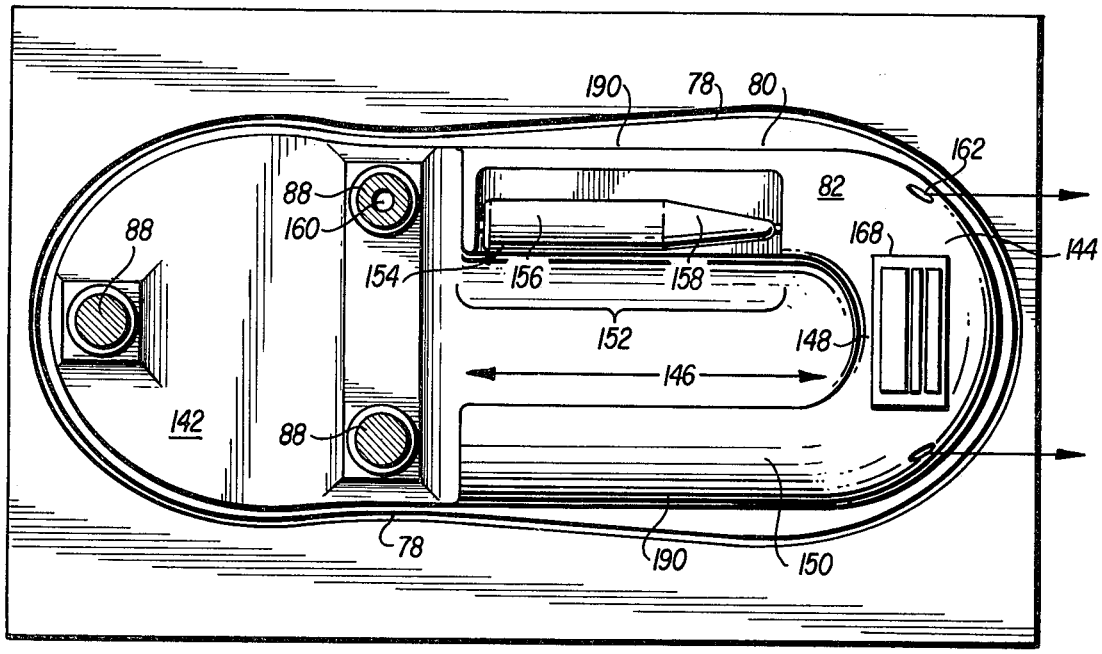
FIG. 11 shows a view taken along line 11—11 of FIG. 6, indicating the cooperation between the sole plate and heat-sealing dies to permit ease of removable of a completed slipper.

FIG. 11 shows a view taken along line 11—11 of FIG. 6 which indicates the unique design of sole plate 82. Recess 146 may be seen clearly in this view, including concave forward wall 148, infeed side wall 150 and outfeed side wall 152. The mounting of roller 154 is also shown. FIG. 11 shows the shape of sole plate 82 when resting upon insulating core 80 of lower heat-sealing die 76. Sole plate 82 is shaped similarly to sole 34 of slipper 32. To faciliate ejection of a completed slipper from the sole plate under the action of air jets 162 and 164, sole plate 82 comrises straight side edges 190 which extend from approximately the instep location of sole plate 82 to rounded toe forming portion 144. The provision of straight edges 190 ensures that sole plate 82 will not interfere the movement of the completed slipper from the sole plate as air jets 162 and 164 are actuated.

Figure 12:
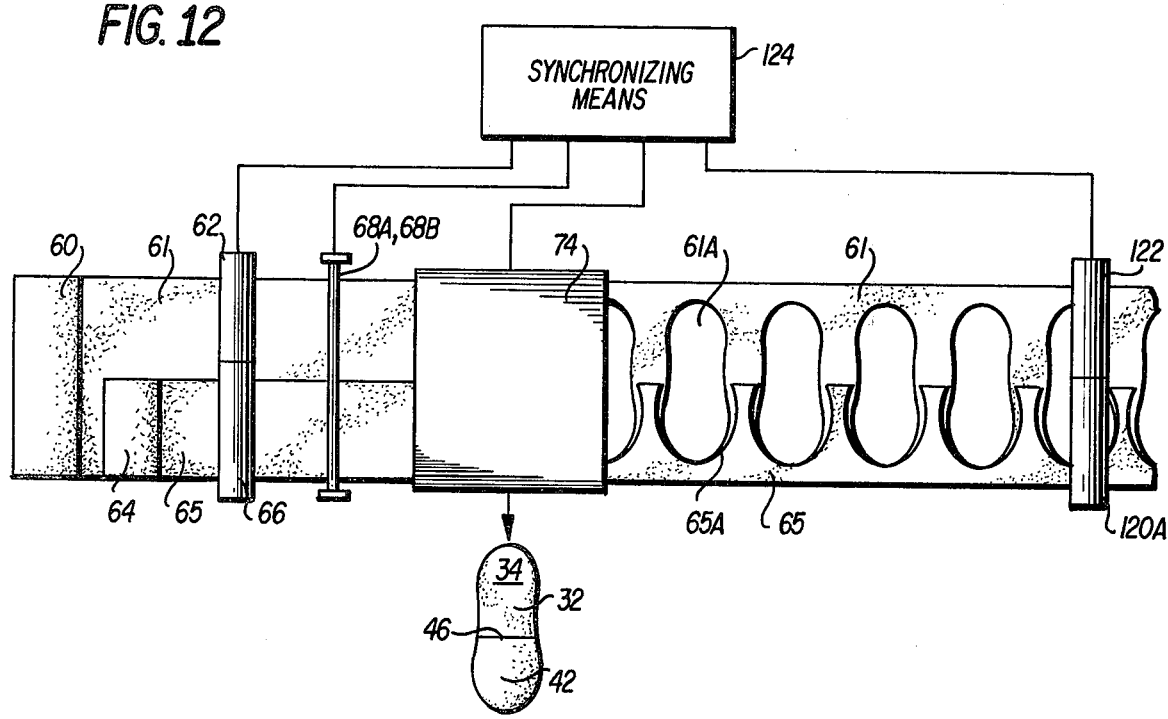
FIG. 12 shows a schematic plan view of the apparatus according to the invention, indicating one possible arrangement of outfeed rollers for the bands of synthetic polymeric material.

FIG. 12 shows a schematic plan view of a slipper manufacturing apparatus according to the invention. As indicated, bands 61 and 65 are fed from rolls of material 60 and 64 through infeed rollers 62 and 66 and pass feed tensioning fingers 68a and 68b into heat-sealing die press 74, wherein the complete slippers 32 are formed, heat-sealed and ejected. As bands 61 and 65 enter die press 64, their lower edges, as viewed in FIG. 12, are substantially aligned and pass between the toe forming portions of heat-sealing dies of 78 and 92. The upper edge of band 65 passes over the instep portion of the heat-sealing dies and sole plate 82 and the upper edge of band 61 passes over the heel forming portion of the heat-sealing dies. Thus, on the outfeed side of the machine, band 61 is seen to include a series of openings 61a caused by the removal of slipper soles 34 within die press 74. Likewise, band 65 includes U-shaped notches 65a along the upper edge thereof which correspond in shape to uppers 42 removed therefrom by heat-sealing die press 74. FIG. 12 illustrates the preferred location of outfeed rollers 122 for band 61 and a possible location of outfeed rollers 120a for band 65. The illustrated location of outfeed rollers 120a is not preferred for reasons to be discussed with regard to FIG. 13.

Figure 13:
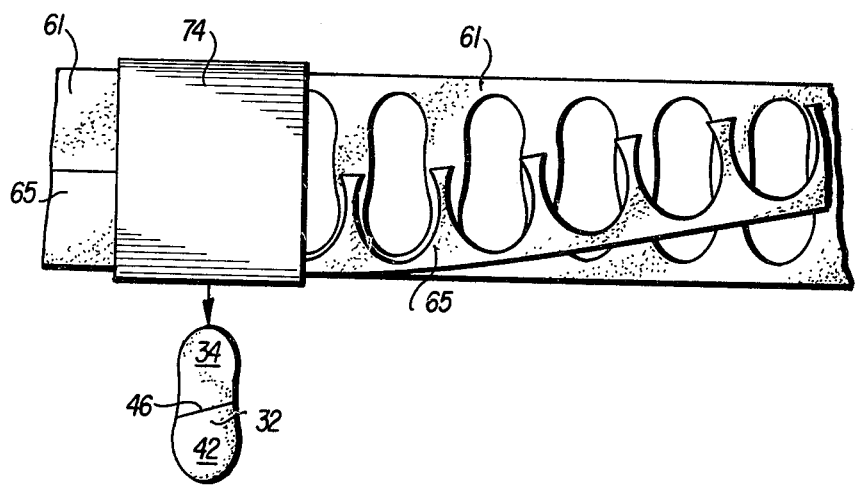
FIG. 13 shows a schematic plan view similar to that of FIG. 12 indicating the shift of the upper band of synthetic polymeric material which may occur due to the formation of an instep engaging arch in the slipper according to the invention.

FIG. 13 illustrates the position which band 65 tends to assume if outfeed rollers 120a are used as shown in FIG. 12. The lateral skewing of band 65 results from the effect of drawing a portion along only one edge of band 65 into recess 146 of sole plate 82, under the influence of rollers 112 and 113. Reference should be made to FIGS. 6 and 8 at this time. As rollers 112 and 113 descend into recess 146 and thereby draw a portion of band 65 back into recess 146 over roller 154, the tendency is for upper band 65 to shift in the manner shown in FIG. 13. This is because the force applied by rollers 112 and 113 tends to draw material along only one edge of band 65 back into recess 146. If the apparatus were operated in the configuration shown in FIG. 12, the skewing of band 65 would cause the instep gripping arch 46 of slipper 32 to extend diagonally across the width of sole 34 as shown in FIG. 13 rather than straight across the width of sole 34 as indicated in FIG. 12, or parallel to the direction of movement of the bands 61 and 65 through die press 74. While slippers having such diagonally oriented instep gripping arches 46 are still suitable for wear and exhibit the resistance to tearing achieved by the invention, the appearance of the resulting product is obviously variable and less satisfactory than in the case where the arch is straight across sole 34.

Figure 14:
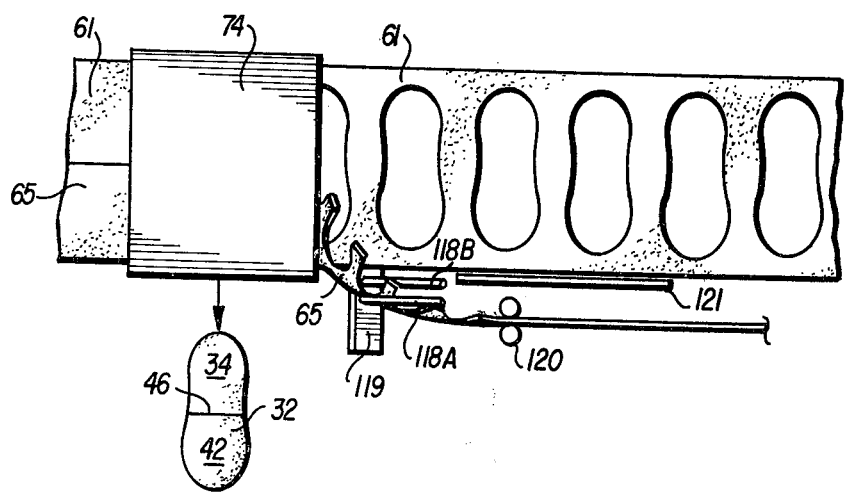
FIG. 14 shows a plan view of the preferred arrangement for the outfeed rollers according to the invention which correct the displacement of the upper band of material indicated in FIG. 13.

To correct this condition and ensure that the instep gripping arch 46 will be properly oriented across the sole of slipper 32, a revised outfeed arrangement has been developed for band 65, as shown in FIGS. 5, 7 and 14. As indicated, the scrap portion of band 65 is drawn from heat sealing die press 74 and threaded between spaced guide fingers 118a and 118b which extend upwardly from the plane of travel or drawing direction of band 65 as it moves through die press 64. FIGS. 118A and 118B are spaced laterally from the lower edge of band 65, as viewed in FIG. 14, and are mounted upon adjustable bracket 119 which may be moved laterally of band 61 and of the initial path of band 65 as it exists die press 74. From this point, band 65 is fed through outfeed rollers 120, oriented similarly to fingers 118A and 118B. A guide wall 121 ensures separation of the scrap portion of band 61 and the scrap portion of band 65. In operation, the position of guide fingers 118A and 118B is adjusted to counteract the tendency of rollers 112 and 113 to skew band 65 relative to band 61, thereby ensuring that instep gripping arch 46 is properly oriented relative to sole 34 of slipper 32. Fingers 118A and 118B may also be used to adjust for shifts in the lateral position of band 65 as it enters die press 74.

Having described our invention in sufficient detail to enable one of ordinary skill in the art to make and use it, we claim:

1. Apparatus for making slippers of heat-sealable synthetic polymeric sheeting material, said slippers having a sole with heel, instep and toe portions and an upper with toe and instep covering portions, comprising:
   means for dispensing a first band of said material of a first width greater than a desired length of said slipper sole;
   means for dispensing a second band of said material of a second width narrower than said first width but greater than a desired length of said upper;
   a first heat-seaing die having a first perimetral die face configuration at least for said toe portion of said sole;
   a second heat-sealing die, disposed opposite said first heat-sealing die, having a second perimetral die face configuration for at least for said toe and instep covering portions of said upper, said first and second perimetral die faces being essentially congruent in shape at least around said instep and toe portions;
   means for drawing said first and second bands of material between said first and second heat-sealing dies in a first direction essentially transverse to the length of said perimetral die face configurations, in a position to be contacted simultaneously by by said perimetral die face configurations when said first and second dies are brought together;
   means operatively associated with said first and second dies for providing, as measured across said die faces in said drawing direction, a progressively greater length of said second band from the toe portion to the instep portion of said second heat-sealing die face than of said first band from the toe portion to the instep portion of said first heat-sealing die face, when said dies are brought together; and
   means for bringing said first and second dies together to cause heat-sealing between said first and second bands along at least a portion of said die faces.

2. An apparatus as claimed in claim 1, wherein said means for providing a greater length of said second band comprises:
   a sole plate movably mounted between said first and second heat-sealing dies, said sole plate having a recess essentially transverse to said drawing direction on the surface thereof adjacent said second heat-sealing die, said first band of material being drawn between said sole plate and said first heat-sealing die and said second band of material being drawn between said sole plate and said second heat-sealing die; and
   roller means resiliently mounted to said second heat-sealing die and adaped to press a portion of one edge of said second band of material into said recess as said first and second die means are brought together, whereby said progressively greater length is provided.

3. An apparatus as claimed in claim 2, further comprising means located on the infeed side of said heat-sealing dies for tensioning said bands of material before said heat-sealing dies are brought together, and wherein said sole plate comprises roller means located on the outfeed side of said recess for facilitating movement of said second band of material into said recess from said outfeed side.

4. An apparatus as claimed in claim 2, wherein said drawing means comprises means located on the outfeed side of said heat-sealing dies for adjustably biasing said second band of material laterally of said first band, whereby said one edge of said second band remains essentially parallel to said drawing direction when said roller presses said portion of said one edge into said recess.

5. An apparatus as claimed in claim 2, further comprising means for opening said first and second heat-sealing dies; means for separating a completed slipper from said first and second bands; and means operatively associated with said sole plate for removing a completed slipper from said sole plate when said dies have opened.

6. An apparatus as claimed in claim 2, wherein said first heat-sealing die comprises a central, heat-insulating portion and a peripheral, heat-conducting die face.

7. An apparatus as claimed in claim 2, wherein said sole plate comprises a base plate with a rounded, toe forming portion rising from one end thereof and corresponding in location to the toe portions of said first and second dies, and a recess extending rearwardly of said toe portion and corresponding in location to the instep portions of said first and second dies.

8. An apparatus as claimed in claim 7, wherein said recess comprises a concave forward wall sloping from said toe forming portion toward said base plate and infeed and outfeed side walls extending rearwardly, said outfeed side wall comprising a roller tapered toward said toe forming portion for facilitating movement of said second band of material into said recess from said outfeed side.

9. An apparatus as claimed in claim 2, wherein said second heat-sealing die is also essentially congruent with the heel portion of said first heat sealing die, one of said die faces being relieved to provide increased clearance in said heel portion relative to said instep and toe portions, whereby excessive fusing of the edges of said sole is avoided in said heel portion.

10. An apparatus as claimed in claim 9, wherein said one of said die faces includes an unrelieved section at the back of said heel portion, to prevent rocking at said dies due to said relieved portion.

11. An apparatus as claimed in claim 2, wherein said sole plate includes a flattened anvil surface thereon located adjacent said recess, said second heat-sealing die including a design-impressing die so located as to press said second band into contact with said anvil surface, whereby a design may be impressed on the upper of said slipper.

12. An apparatus as claimed in claim 4, wherein said adjustable biasing means comprises spaced guide fingers for receiving said second band on the output side of said heat-sealing dies, said fingers extending on one side of a plane defined by said second band as it traverses said heat-sealing dies; and means for moving said guide fingers essentially transversely to said drawing direction.

13. An apparatus as claimed in claim 5, wherein said means for removing a completed slipper comprises air jets located in sole plate for accelerating a completed slipper from said sole plate when said dies have opened and means for depressing scrap portions of said bands of material to permit said completed slipper to be accelerated away from said sole plate.

14. An apparatus as claimed in claim 8, wherein said resiliently mounted roller is tapered at one end to conform to said concave forward wall.

15. An apparatus as claimed in claim 5, wherein said sole plate comprises essentially straight side edges to facilitate removal of a completed slipper therefrom.

* * * * *